(12) United States Patent
Delisle et al.

(10) Patent No.: US 11,915,111 B2
(45) Date of Patent: Feb. 27, 2024

(54) FEDERATED MACHINE LEARNING IN ADAPTIVE TRAINING SYSTEMS

(71) Applicant: CAE Inc., Saint-Laurent (CA)

(72) Inventors: Jean-François Delisle, Saint-Laurent (CA); Ben Winokur, Saint-Laurent (CA); Navpreet Singh, Saint-Laurent (CA)

(73) Assignee: CAE INC., Saint-Laurent (CA)

( * ) Notice: Subject to any disclaimer, the term of this patent is extended or adjusted under 35 U.S.C. 154(b) by 0 days.

(21) Appl. No.: 18/184,011

(22) Filed: Mar. 15, 2023

(65) Prior Publication Data

US 2023/0297888 A1 Sep. 21, 2023

Related U.S. Application Data

(60) Provisional application No. 63/319,974, filed on Mar. 15, 2022.

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS 10,685,582 B2  6/2020  Falash et al.
2022/0129706 A1  4/2022  Vivona et al.

OTHER PUBLICATIONS

Billard, et al., Using Bayesian Networks to Model Competence of Lifeboat Coxswains, the International Journal on Marine Navigation and Safety of Sea Transportation, vol. 14, No. 3, Sep. 2020, pp. 585-594 (Year: 2020).*
Mugunthan, A Practical Approach to Federated Learning, Doctoral Thesis, Massachusetts Institute of Technology, 2022, pp. 1-143 (Year: 2022).*
Sav, et al., POSEIDON: Privacy-Preserving Federated Neural Network Learning, Network and Distributed Systems Security (NDSS) Symposium 2021, Feb. 21-25, 2021, pp. 1-18 (Year: 2021).*
Official Action from corresponding Canadian patent application No. 3,193,081 dated Jun. 14, 2023.
Sandeep, R. T., "Personalized and Communication Cost Reduction Models in Federated Learning", University of Regine, Jan. 2022.

* cited by examiner

*Primary Examiner* — Wilbert L Starks
(74) *Attorney, Agent, or Firm* — Gowling WLG (Canada) LLP

(57) ABSTRACT

A federated machine learning system for training students comprises a first adaptive training system having a first artificial intelligence module for adapting individualized training to a first group of students and for developing a first learning model based on a first set of learning performance metrics. A second adaptive training system provides individualized training to a second group of students and has a data property extraction module for extracting statistical properties from a second set of learning performance metrics for the second group of students. A data simulator module generates simulated performance metrics using extracted statistical properties from the second set of learning performance metrics to thereby generate a second learning model. A federation computing device receives first and second model weights for the first and second learning models and generates or refines a federated model based on the first and second model weights.

24 Claims, 6 Drawing Sheets

FEDERATED MACHINE LEARNING IN ADAPTIVE TRAINING SYSTEMS

CROSS-REFERENCE TO RELATED APPLICATIONS

This application claims priority from U.S. Provisional Patent Application 63/319,974 filed Mar. 15, 2022 which is hereby incorporated by reference.

TECHNICAL FIELD

The present invention relates generally to computer-based systems and computer-implemented methods for training and, more specifically, to computer-based systems and computer-implemented methods for training a student in the operation of a machine such as an aircraft.

BACKGROUND

To train a student to operate a complex machine such as, for example, an aircraft, it is known to employ a diverse learning ecosystem composed of multiple learning environments that exposes the student to different types of learning environments. For example, in the case of training a student to pilot an aircraft, the student typically is exposed to three learning environments: (i) electronic learning, such as online reading material, digital coursework, lessons, seminars, instructional videos, and online testing; (ii) simulation training in a flight simulator; and (iii) actually flying an aircraft with an instructor as co-pilot.

It is known to provide an adaptive training system to adapt the training to the particular learning traits of students. One such example is disclosed in U.S. Pat. No. 10,685,582 (Falash), which is hereby incorporated by reference.

With multiple training centers each having its own adaptive training system, it is known to federate the adaptive training systems to form a federated machine learning system. Various technical challenges are posed in creating a federated machine learning system. One such challenge is in the cold-deployment of a new adaptive training system within the federated machine learning system. Another challenge arises in the context of a secure training center such as, for example, a military training center where security restrictions prohibit the local deployment of artificial intelligence solutions that autonomously collect, process and share data with the federated machine learning system. A new technology that would address one or both of the foregoing technical challenges would be highly desirable.

SUMMARY

In general, the present invention provides a computerized system, method and computer-readable medium for implementing a federated machine learning system for training students. The federated machine learning system includes first and second adaptive training systems at first and second training centers, respectively. A first artificial intelligence module adapts individualized training to a first group of students at the first training center for developing a first learning model based on a first set of learning performance metrics for the first group of students. A second adaptive training system provides individualized training to a second group of students and has a data property extraction module for extracting statistical properties from a second set of learning performance metrics (training data) for the second group of students. A data simulator module generates simulated performance metrics (simulated training data) using extracted statistical properties from the second set of learning performance metrics for the second group of students to thereby generate a second learning model. A federation computing device receives first and second model weights for the first and second learning models and then generates or refines a federated model based on the first and second model weights. The first and second model weights are communicated back to the first and second adaptive training systems.

One inventive aspect of the disclosure is a federated machine learning system or training students. The federated machine learning system comprises a first adaptive training system at a first training center to provide individualized training to a first group of students, the first adaptive training system comprising a first computing device executing a first artificial intelligence module for adapting the individualized training to each of the first group of students at the first training center and for developing a first learning model based on a first set of learning performance metrics for the first group of students. The federated machine learning system also comprises a second adaptive training system at a second training center to provide individualized training to a second group of students, the second adaptive training system comprising a second computing device executing a data property extraction module for extracting statistical properties from a second set of learning performance metrics (training data) for the second group of students at the second training center. The federated machine learning system further comprises a data simulator module in data communication with the data property extraction module for generating simulated performance metrics (simulated training data) using extracted statistical properties from the second set of learning performance metrics for the second group of students to thereby generate a second learning model. A federation computing device in data communication with both the first computing device and the data simulator module receives first model weights for the first learning model from the first computing device and receives second model weights from the data simulator module. The federation computing device comprises a processor to generate or refine a federated model based on the first and second model weights and to communicate federated model weights to the first computing device and to the data simulator module.

Another inventive aspect of the disclosure is a computer-implemented method of implementing a federated machine learning system for training students. The method entails providing a first adaptive training system at a first training center to provide individualized training to a first group of students, the first adaptive training system comprising a first computing device executing a first artificial intelligence module for adapting the individualized training to each of the first group of students at the first training center. The method entails developing, using the first artificial intelligence module, a first learning model based on a first set of learning performance metrics for the first group of students. The method further entails providing a second adaptive training system at a second training center to provide individualized training to a second group of students and extracting statistical properties from a second set of learning performance metrics (training data) for the second group of students using a data property extraction module. The method involves generating, using a data simulator module, simulated performance metrics (simulated training data) using extracted statistical properties from the second set of learning performance metrics for the second group of students to thereby generate a second learning model. The method also involves providing a federation computing device in data communication with both the first computing device and the data simulator module to receive first model weights for the first learning model from the first computing device and to receive second model weights from the data simulator module. The method further entails generating or refining, using the federation computing device, a federated model based on the first and second model weights and communicating the federated model weights to the first computing device and to the data simulator module.

Another inventive aspect of the disclosure is a non-transitory computer-readable medium having instructions in code which are stored on the computer-readable medium and which, when executed by one or more processors of one or more computers, cause the one or more computers to implement a federated machine learning system for training students by providing a first adaptive training system at a first training center to provide individualized training to a first group of students, the first adaptive training system comprising a first computing device executing a first artificial intelligence module for adapting the individualized training to each of the first group of students at the first training center and developing, using the first artificial intelligence module, a first learning model based on a first set of learning performance metrics for the first group of students. The code also implement the federated machine learning system by providing a second adaptive training system at a second training center to provide individualized training to a second group of students, extracting statistical properties from a second set of learning performance metrics (training data) for the second group of students using a data property extraction module and generating, using a data simulator module, simulated performance metrics (simulated training data) using extracted statistical properties from the second set of learning performance metrics for the second group of students to thereby generate a second learning model. The code also implements the federated machine learning system by providing a federation computing device in data communication with both the first computing device and the data simulator module to receive first model weights for the first learning model from the first computing device and to receive second model weights from the data simulator module, generating or refining, using the federation computing device, a federated model based on the first and second model weights, and communicating the federated model weights to the first computing device and to the data simulator module.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
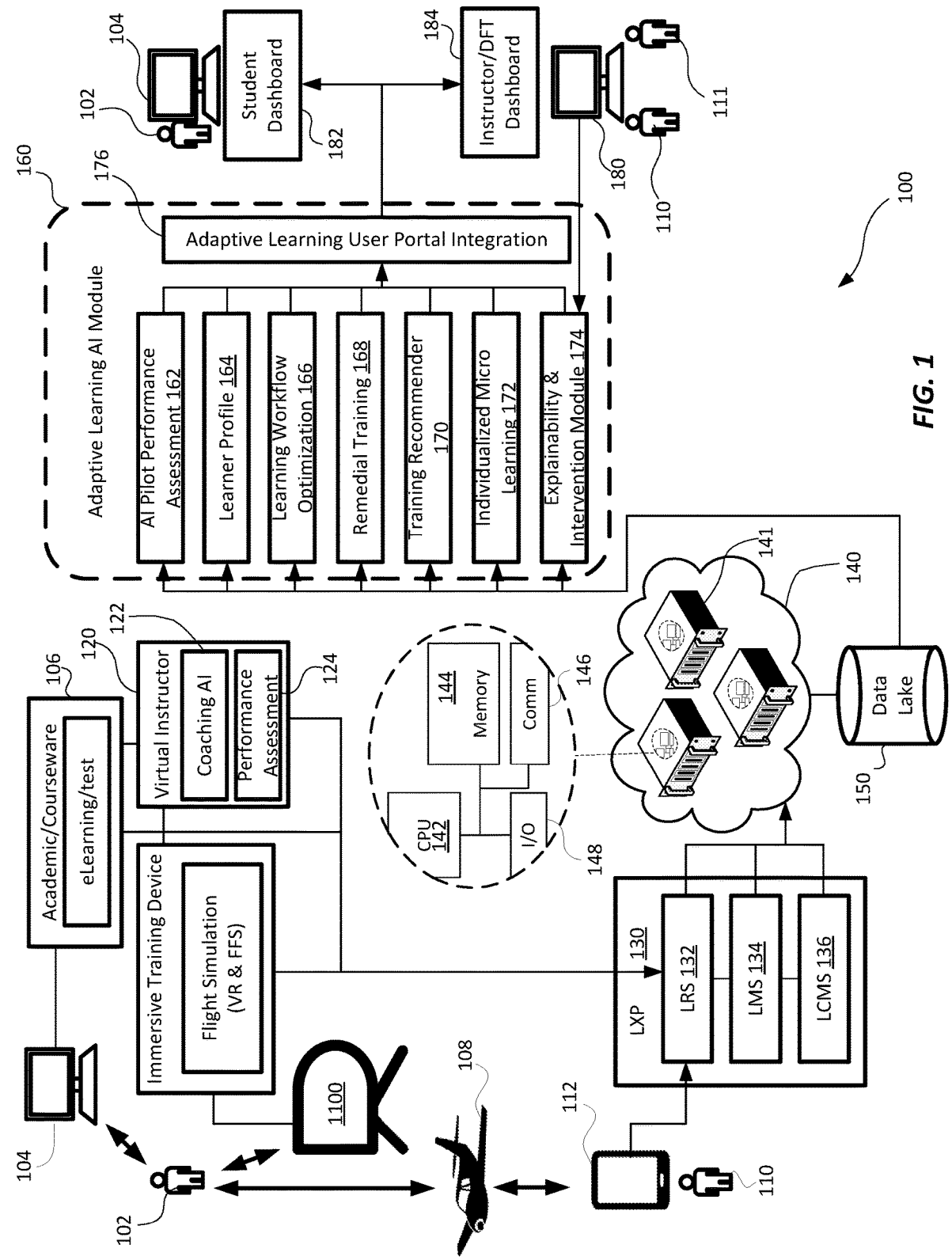
FIG. 1 depicts a system for training a student for use with an embodiment of the present invention.

FIG. 1 depicts a computerized system for training a student to operate an actual machine in accordance with an embodiment of the present invention. In this specification, the expression "actual machine" is used to distinguish from a simulated machine that is simulated in a computer simulation to function like the actual machine to thereby train the student in the operation of the actual machine. In other words, the simulated machine is a virtual digital representation of the actual machine. A flight simulator that simulates the operation of an actual aircraft is one example. The student is a person seeking to learn to operate the actual machine, i.e., a physical and tangible (real-world) machine. The actual machine may be a vehicle such as an aircraft, ship, spacecraft or the like. The actual machine may also be non-vehicular equipment such as a power station, healthcare or medical system, cybersecurity system, or the like. In this specification, the expression "student" is used in an expansive sense to also encompass any person who is training to improve or hone knowledge, skills or aptitude in the operation of the actual machine such as, for example, a licensed pilot who is doing periodic training for certification or recertification purposes.

In the embodiment depicted by way of example in FIG. 1, the computerized system is generally designated by reference numeral 100. The computerized system 100 is designed for training a student 102 to operate an actual machine by providing a diverse learning ecosystem composed of multiple learning environments that uses an artificial intelligence to adapt to the learning of the student, as will be explained in greater detail below. In the specific example of FIG. 1, the computerized system 100 is a pilot training system for training a student pilot to fly an aircraft. As noted above, the computerized system 100 may be used to train students to operate other types of machines.

In the embodiment depicted by way of example in FIG. 1, the computerized system 100 includes an electronic learning module 106 for delivering electronic learning content to a student computing device 104 used by the student 102. The electronic learning module may include reading material, audio presentations, video presentations, etc. as well electronic tests to assess the student's learning of the subject matter.

Figure 2:
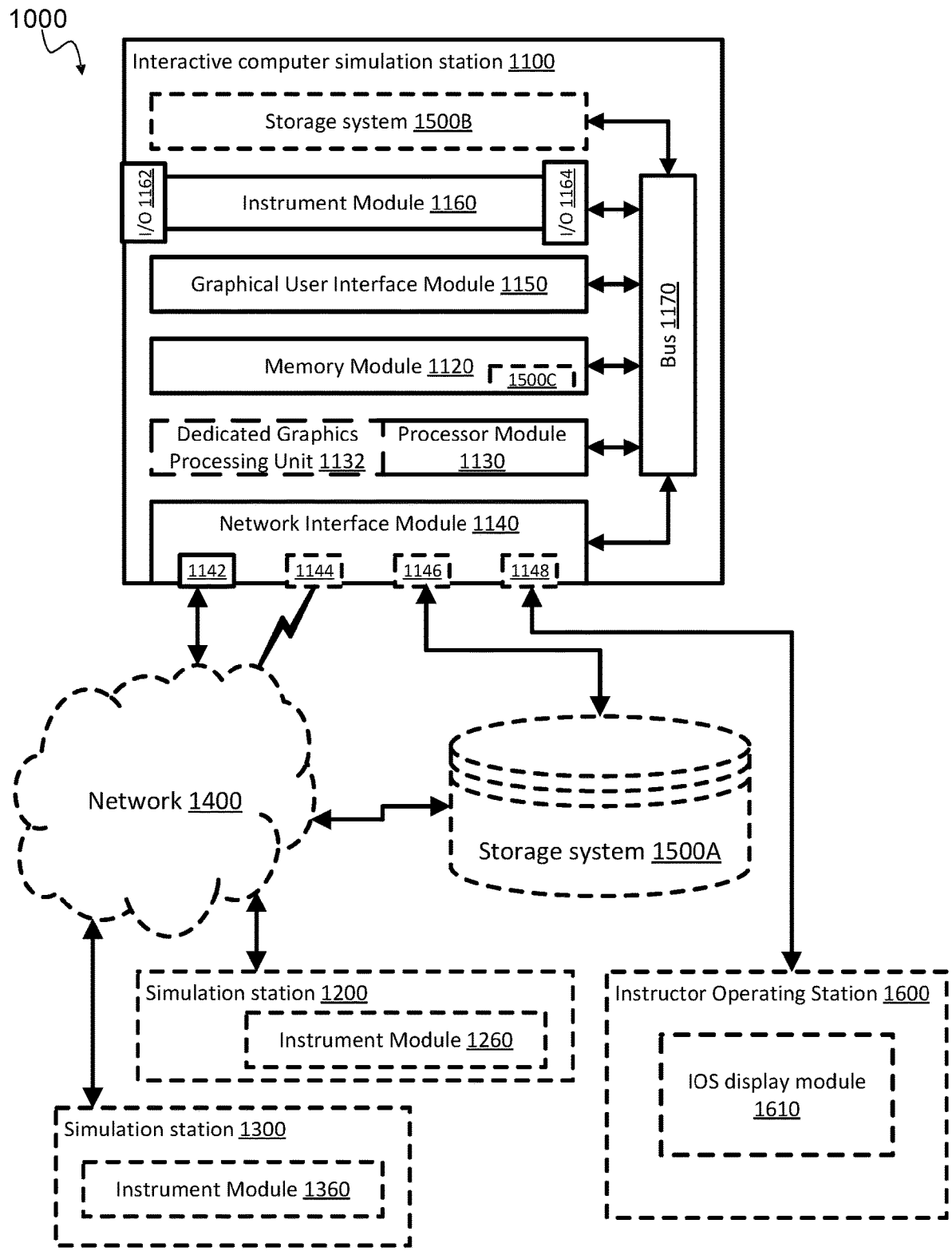
FIG. 2 depicts a simulation system that may be used in the system of FIG. 1.

In the embodiment depicted by way of example in FIG. 1, the computerized system 100 includes a simulation station 1100 of a simulation system 1000 shown in FIG. 2 for simulating operation of the actual machine. The simulation system 1000 will be described in greater detail below in relation to FIG. 2. The simulation station 1100 provides a simulated machine operable in the simulation system by the student. In this particular example, the simulation station 1100 is a flight simulator. As will be described in greater detail below, the system 100 optionally includes a virtual instructor 120 having a coaching AI module 122 and a performance assessment module 124. The coaching AI module 122 and the performance assessment module 124 respectively coach and assess the student when operating the simulated vehicle in the simulation station 1100. The two modules may be combined into a single module in another embodiment.

In addition to the electronic learning and the simulation training, the student also practice actual flying of the aircraft 108 with an instructor 110 as co-pilot. The aircraft 108 is the actual machine in this particular example. The instructor 110 grades the performance of the student 102 flying the aircraft 108. The instructor 110 may record grades and information of performance evaluations using an instructor computing device 112 such as a tablet, laptop, smart phone or other mobile device. The actual flying, simulation training and electronic learning together constitute a diverse learning environment for training the student.

In the embodiment depicted by way of example in FIG. 1, the computerized system 100 includes a learning experience platform (LXP) 130 for receiving and processing student performance data of the student in the diverse learning ecosystem that is composed of multiple learning environments. That is, the LXP 130 receives and processes three types or sources of data in this embodiment: (i) instructor-graded performance results of the student based on the student operating the actual machine, (ii) simulation performance results for the student operating the simulated vehicle in the simulation system and (iii) electronic learning content results from the electronic learning module.

As will be described in greater detail below, as depicted by way of example in FIG. 1, the LXP 130 includes a learning record store (LRS) module 132, a learning management system (LMS) 134, and a learning content management system (LCMS) 136. The LXP data is shared with a cloud-based artificial intelligence module 140 that is communicatively connected to a data lake 150 (i.e. a data storage or data repository) that stores data for a plurality of students to enable the cloud-based artificial intelligence module 140 to adapt the training of the student to the particular profile of the student. The cloud-based artificial intelligence module 140 has a plurality of computers or servers 141. Each server 141 has a server processor or central processing unit (CPU) 142, a memory 144, a data communication device 146 and may also include an input/output device 148.

In the embodiment depicted by way of example in FIG. 1, the computerized system 100 includes an adaptive learning artificial intelligence (ALAI) module 160. The ALAI module may be part of the cloud-based artificial intelligence module 140 or a separate entity in data communication therewith. In the embodiment depicted by way of example in FIG. 1, the adaptive learning artificial intelligence (ALAI) module 160 receives student performance data or LXP data from the LXP 130, optionally via the cloud-based artificial intelligence module 140 to adapt training of the student based on the student performance data or the LXP data. The ALAI module 160 includes a learner profile module 164 that profiles the student to generate an AI-generated learner profile of the student and a training task recommendation module 170 that generates AI-generated recommendations that recommend one or more training tasks for the student based on the LXP data. The ALAI module 160 includes an explainability and pedagogical intervention module 174 in data communication with an instructor computing device 180 for providing to an instructor explanations for the AI-generated recommendations and optionally enabling the instructor to intervene to modify the AI-generated recommendations.

In the embodiment depicted by way of example in FIG. 1, the explainability and pedagogical intervention module 174 may receive input data from a variety of sources in order to provide explanations for the AI-based decisions and recommendations made by the various components of the ALAI 160. For example, the LRS 132 may communicate training content data in the form of content metadata, learning objectives, curricula, and courses to the explainability and pedagogical intervention module 174. In the specific context of pilot training, the AI Pilot Performance Assessment module 162 may provide to the explainability and pedagogical intervention module 174 data on learning trends and progress metrics broken down by cohort, student, and competency (e.g. International Civil Aviation Organization (ICAO) competencies) in absolute numbers or in relation to training curricula and/or metrics of an average population of students. From the training task recommendation module 170 may be received data related to predictions of future performance, risks of failure, and recommendation(s) as to the next training task(s). From the learner profile module 164 may be received a student-specific profile in the form of a listing of clusters to which the student belongs, the clusters reflecting learning styles and preferences. From both the LCMS 136 and LMS 134 may be received data related to training center operational parameters (e.g. operation costs, schedule, location, and availability of human and material resources). Furthermore, the explainability and pedagogical intervention module 174 may receive data from the student and instructor dashboards 182, 184 and/or from the LMS 134. This data may contain recommendations for an optimal sequence of learning activities on a learning platform (e.g. an academic lesson and/or training session on VR-based simulator and/or training session on a full flight simulator). Furthermore, the explainability and pedagogical intervention module 174 may also receive data from the individualized micro-learning path module 172 such as data related to micro-learning activities. Finally, the explainability and pedagogical intervention module 174 may be in data communication with the instructor computing device 180 to enable the instructor 110 or director of training 111 to communicate with the ALAI module 160 to implement new policies, change rules and/or perform manual overrides.

In the embodiment of FIG. 1, the explainability and pedagogical intervention module 174 outputs data to the student and instructor dashboards 182, 184 as well as to the LMS 134 and learning workflow optimization module 166. This output data may include justifications, reasons, explanations, or the like for the AI-generated recommendations that are generated by any one or more of the training task recommendation module 170, the learning workflow optimization module 166, and the individualized micro-learning path module 172.

The explainability and pedagogical intervention module 174 provides detailed information on the AI-generated recommendations and may also provide information on the potential impact of the AI-generated recommendations to the training program individually and globally. For example, an instructor may question the value, reasoning, rationale or assumptions for these AI-generated recommendations. Students, instructors and training directors alike can interact with the explainability and pedagogical intervention module 174 to gain a deeper understanding of the AI-generated recommendations, thereby enabling them to trust the AI-generation recommendations. An instructor has the ability to intervene and modify the default sequence of lessons in the training program and/or to modify the AI-generated recommendations, through an instructional intervention tool. With data and performance visualization, the explainability and pedagogical intervention module 174 reinforces the other modules iteratively with user input, whether it is the student making learning requests or the instructor applying instructional interventions. For example, an instructor may seek to speed up a particular student's learning so that the student can keep pace with his or her classmates. Interventions may be made not only for educational reasons but also for compliance with new or changing safety requirements in flight operations.

In the embodiment of FIG. 1, the ALAI module 160 includes an adaptive learning user portal integration module 176 to provide a data interface with a student dashboard 182 that is displayed on a student computing device 104 to a student 102. The adaptive learning user portal integration module 176 also provides a data interface to an instructor dashboard 184 displayed on an instructor computing device 180 to an instructor 110. Optionally, the instructor dashboard 184 may be modified or reconfigured to present information to a director of flight training (DFT) 111 via a DFT computer or DFT mobile device.

The computerized system 100 described thus provides AI-based adaptive that makes the training of a student more efficient. This adaptive learning technology orchestrates learning sequences for the student and recommends an optimal, or at least a far more efficient, method of delivering individualized educational content to the student based on his or her preferred learning style in a training program. In the example context of pilot training, the results of instructor-led training, simulated and real flights, and ground school activities are used to customize learning activities and resources so that a student can complete the training program with optimal, or at least highly improved, efficiency. This technology enables the instructor to spend more time focusing on coaching the student on the less tangible aspects or more nuanced elements of flight training.

The adaptive learning technology optimizes or at least greatly improves training efficient in a diverse learning ecosystem composed of multiple learning environments. The diverse learning ecosystem trains the student by providing theoretical content, simulation training and actual training on a real actual machine. In the context of pilot training, the latter involves actual in-flight training in a real aircraft.

As introduced above, the LXP 130 comprises a learning record store (LRS) module 132, a learning management system (LMS) 134, and a learning content management system (LCMS) 136. Using content derived from the content management system (LCMS) 136 and the hierarchy of knowledge, skills and aptitudes documented in the learning management system (LMS) 134, the adaptive learning AI module 160 recommends individualized learning paths based on the student's performance and preference (selected by the student or inferred from performance metrics) in several learning environments, such as academic/theoretical coursework and exams, simulator training and real flights. The adaptive learning AI module 160 recommends additional study materials and course paths. The adaptive learning AI module 160 also gathers the course curriculum which allows the adaptive learning AI module 160 to recommend for the student an individualized learning path through lessons and maneuvers. adaptive learning AI module 160 makes recommendations based on the information available in the Learning Record Store (LRS) module 132. The adaptive learning AI module 160 can increase or decrease the difficulty of a training task based on student performance metrics. For example, if the adaptive learning AI module 160 determines that a student is having difficulty with a particular type of task, the adaptive learning AI module 160 may recommend remedial training in that particular task. For example, if the student is having trouble performing a particular airborne maneuver in a simulator, the adaptive learning AI module 160 may recommend that the student do remedial theoretical study and then return to the simulator for additional practice on the simulator doing that particular maneuver. Alternatively, the adaptive learning AI module 160 may cause a real-time adjustment to a simulator training task by lowering the difficulty of the task while it is being attempted by the student. For example, in the context of flight training, the adaptive learning AI module 160 may cause the flight simulator to adjust a weather parameter or visibility parameter during the flight maneuver to make it easier for the student. For example, the flight simulator may reduce the turbulence and/or crosswind speed or increase visibility. As another example, the flight simulator may alter the responsiveness of a degraded flight control surface during the flight maneuver to make it easier for the student to perform the maneuver.

Optionally, the ALAI module 160 includes an AI student performance assessment module 162. The AI student performance assessment module 162 receives input data from the learning record store (LRS) module 132 in the form of performance history data for students across diverse training environments. The AI student performance assessment module 162 outputs data to all modules of the ALAI 160 and to the student and instructor dashboards 182, 184. The data output by the AI student performance assessment module 162 may include learning trends and progress metrics broken down by cohort, student, and competency (e.g. ICAO competencies) in raw or absolute numbers and also in relation to training curricula and metrics of an average population of students of which the student being assessed is a member.

The AI student performance assessment module 162, in one embodiment, provides learning status within the training program and allows students to view their own progress through the program. Instructors can also view the learning path for different groups of pilots. For a training manager, this could be a useful indicator of how well the training program trains pilots. The overall assessment may be based, for example, on the eight ICAO competencies which can be used to serve as the basis for micro-learning recommendations to increase the development of specific skills.

The AI student performance assessment module 162, in one embodiment, takes into account automated performance assessments generated by the Virtual Instructor Module 120, which is configured to provide real-time assistance to instructors during simulation training based on the flight telemetries, which assistance can be in the form of visual and/or audio recommendations based on flight status and/or performance.

As introduced above, the ALAI module 160 includes a learner profile module 164 whose function it is to profile the student based on the student's performance metrics in the diverse learning environment and also optionally based on psychometric test data indicative of the psychometric characteristics of the student. The learner profile module 164 receives its data from the data lake 150. The data received by the learner profile module 164 may include student-specific learning data in the form of performance and telemetries related to training sessions, performance and behavior related to learning sessions, overall flight history, personality traits, and demographics. The learner profile module 164 outputs data to all other modules of the ALAI module 160 (except the AI Pilot Performance Assessment Module 162). The data output by the learner profile module 164 may include student-specific profile data in the form of a listing of clusters to which the student belongs, the clusters reflecting learning styles and preferences. The learner profile module 164 provides a complete portrait of the student. The pilot grouping (clustering) involves identifying the models of performance and learning behavior. This learner profile module 164 therefore applies a segmentation of students into performance and preference categories (groups or clusters). Students are grouped into categories based on their performance, which indicates where a student stands in relation to others. By associating a student with a cluster or group, the ALAI module 160 can adapt the training for the student to provide a more effective and efficient learning experience through the training program. In other words, learner profile module 164 enables the ALAI module 160 to tailor (i.e., adapt, customize, individualize, or personalize) a training approach or style for each particular student.

Student or pilot segmentation into clusters utilizes one or more data-driven AI clustering algorithms to create student profiles, identify the pattern of each profile in terms of learning performance and behavior, and then provide actionable recommendations on a cohort or cluster level. In one specific embodiment, the clustering algorithm may involve using T-distributed Stochastic Neighbor Embedding (tSNE) for dimension reduction and K-means for the clustering to generate the learner profiles.

As introduced above, the ALAI module 160 includes a training task recommendation module 170 that generates AI-generated recommendations that recommend one or more training tasks for the student based on the student performance data or LXP data. In this embodiment, the training task recommendation module 170 receives input data from three sources: (i) the LRS module 132 in the form of, for example, training content data such as content metadata, learning objectives, curricula and courses; (ii) the AI Pilot Performance Assessment Module 162 in the form of, for example, learning trends and progress metrics broken down optionally by cohort, student, and competency (e.g. ICAO competencies) in absolute numbers or in relation to a training curriculum or metrics of an average population; and (iii) the learner profile module 164 in the form of, for example, a student-specific profile in the form of, for example, a listing of clusters to which the student belongs, the clusters reflecting learning styles and preferences. In this embodiment, the data output from the training task recommendation module 170 is communicated to the instructor and/or director of flight training (DFT) dashboard 184, to the LXP 130, to an optional learning workflow optimization module 166 (described below in greater detail) and to the explainability and pedagogical intervention module 174. The data output from the training task recommendation module 170 includes, in this embodiment, a prediction of future performance, risks of failure, and one or more recommendations as to the next training task(s). In other words, the training task recommendation module 170 recommends the next program activity for a student, e.g. an individual pilot, to maximize learning efficiency and to minimize the time it takes for a student to complete all required activities of a training program. This training task recommendation module 170 uses the performance history and learner profile to provide key performance indicators. The training task recommendation module 170 uses the skills as a contribution to its recommendation. In one embodiment, the training task recommendation module 170 recommends tasks from performance predictions at course, block and lesson levels using collaborative filtering, a neural network approach Bayesian knowledge tracing (BKT), deep knowledge tracing (DKT), directional graphing in a hybrid AI and expert system-based approach.

In one embodiment, the training task recommendation module 170 includes a block prediction model. This model predicts the number of lessons a student is expected to fail in the upcoming block of lessons based on his or her performance in the previous block of lessons. For example, in flight training, the performance of a student in three previously completed blocks of lessons in three flying categories (e.g. clearhood flying, instrument flying and navigation flying) may be used to predict performance in the next (i.e. fourth) block of lessons. The block prediction model predicts the number of lessons a student will likely fail in the upcoming block of flying lessons, e.g., formation flying. For example, if the block prediction model predicts that the student will fail X lessons in the upcoming block, the system can forewarn the student that they are expected to fail a high number of lessons, e.g. X lessons, in the upcoming block. The student may be notified to put in an extra effort to study and practice in order to pass the challenging lessons that the student is predicted to fail in the upcoming block of lessons. This block prediction model can also help instructors by alerting them that a student is expected to fail a high number of lessons in the upcoming block.

As introduced above, the optional learning workflow optimization module 166 receives data from a plurality of sources. The learning workflow optimization module 166 may receive data from the LRS module 132 in the form of training content data such as a content metadata, learning objectives, curricula and courses. The learning workflow optimization module 166 may also receive data from the AI Pilot Performance Assessment module 162 in the form of learning trends and progress metrics broken down optionally by cohort, student, and competency (e.g. ICAO competencies) in absolute numbers or in relation to training curricula and/or metrics of an average population of students. The learning workflow optimization module 166 may receive data from a training task recommendation module 170 in the form of a prediction of future performance, risks of failure, and recommendation(s) as to the next training task(s). The learning workflow optimization module 166 may receive data from the learner profile module 164 in the form of a student-specific profile that includes a listing of clusters to which the student belongs, the clusters reflecting learning styles and preferences. The learning workflow optimization module 166 may receive data from the learning management system (LMS) 134 and the learning content management system 136 that includes training center operational parameters (e.g. operation costs, schedule, location, and availability of human and material resources). The learning workflow optimization module 166 outputs data to the LMS 134 and to the student and instructor dashboards 182, 184. This output data includes recommendations for an optimal sequence of learning activities on a learning platform (e.g. an academic lesson and/or training session on VR-based simulator and/or training session on a full flight simulator).

The learning workflow optimization module 166 makes it possible to recommend a progressive sequence of activities in the pilot training program in order to optimize, or at least greatly improve the efficiency and efficacy of, the learning path. The optimized sequence is based on the historical activity performance of the individual pilot (student) and on the optimal path. The optimization of the AI learning workflow provides an optimized sequence recommendation of lessons in the program to complete it more efficiently. The learning workflow optimization module 166 provides a list of optimal learning flows using hybrid analysis and an AI-driven approach based on the training task recommendation module 170. It separates students from an optimized course, a standard course, and a remedial course. The learning workflow optimization module 166 shows predictive completion or transition dates for a cohort. The learning workflow optimization module 166 is also optionally configured to analyze trainer-led lesson scores to indicate which areas need improvement or are working well. The learning workflow optimization module 166 is also optionally configured to identify delays in a student's progress and shows predictive completion dates. Optionally, the ALAI module 160 includes a remedial training module 168 to receive performance data and to recommend remedial training based on gaps in the knowledge, skills and aptitudes of the student. The remedial training module 168 may cooperate with, or be integrated with, the learning workflow optimization module 166.

The recommendations generated by the learning workflow optimization module 166 can also optimize learning environments by varying the sequence or relative proportions of the theoretical courses, simulation time, and actual in-plane flying. Effective completion of the program should consider not only time to completion but also the overall knowledge, skill and aptitude of the student at the end of the course.

Optionally, the ALAI module 160 includes an individualized micro learning path module 172. The data received by the individualized micro learning path module 172 derives from the LRS, AI Pilot Performance Assessment module and the learner profile. From the LRS, the individualized micro learning path module 172 receives training content data in the form of, for example, content metadata, learning objectives, curricula, and courses. From the AI Pilot Performance Assessment module, the individualized micro learning path module 172 receives, for example, learning trends and progress metrics broken down by cohort, student, and competency (e.g. ICAO competencies) in absolute number or in relation to a training curriculum and/or metrics of an average population of students. From the learner profile module, the individualized micro learning path module 172 receives a student-specific profile in the form of, for example, a listing of clusters to which the student belongs, the clusters reflecting learning styles and preferences. The individualized micro learning path module 172 outputs data to the LMS 134 and student and instructor dashboards 182, 184. The data output may include micro-learning activities (e.g. viewing a two-minute video addressing a particular pedagogical need or KSA gap).

The individualized micro-learning path module 172 may, for example, focus on a specific learning objective. For example, based on performance metric and KSA gap, this individualized micro-learning path module 172 suggests short courses, seminars short videos, or concise reading material that can be taken out of sequence to address a specific KSA gap. This individualized micro-learning path module 172 adapts the method of delivering training to better suit the learner by recommending pointed and focused course material to maximize the success of the training. This individualized micro-learning path module 172 can also be used by instructional designers to help them decide what micro-learning content to create and how effective it is. The training task recommendation module 170 could be extended to cooperate with the individualized micro-learning path module 172 to make recommendations on micro-learning content during the program.

As introduced above, the simulation station 1100 shown in FIG. 1 is part of a simulation system 1000 depicted in greater detail in FIG. 2. The simulation system 1000 depicted in FIG. 2 is also referred to herein as an interactive computer simulation system 1000. This simulation system provides an interactive computer simulation of a simulated interactive object (i.e., the simulated machine). The interactive computer simulation system 1000 comprises one or more interactive computer simulation stations 1100, 1200, 1300 which may be executing one or more interactive computer simulations such as a flight simulation software for instance.

In the depicted example of FIG. 2, the interactive computer simulation station 1100 comprises a memory module 1120, a processor module 1130 and a network interface module 1140. The processor module 1130 may represent a single processor with one or more processor cores or an array of processors, each comprising one or more processor cores. In some embodiments, the processor module 1130 may also comprise a dedicated graphics processing unit 1132. The dedicated graphics processing unit 1132 may be required, for instance, when the interactive computer simulation system 1000 performs an immersive simulation (e.g., pilot training-certified flight simulator), which requires extensive image generation capabilities (i.e., quality and throughput) to maintain the level of realism expected of such immersive simulation (e.g., between 5 and 60 images rendered per second or a maximum rendering time ranging between 15 ms and 200 ms for each rendered image). In some embodiments, each of the simulation stations 1200, 1300 comprises a processor module similar to the processor module 1130 and having a dedicated graphics processing unit similar to the dedicated graphics processing unit 1132. The memory module 1120 may comprise various types of memory (different standardized or kinds of Random-Access Memory (RAM) modules, memory cards, Read-Only Memory (ROM) modules, programmable ROM, etc.). The network interface module 1140 represents at least one physical interface that can be used to communicate with other network nodes. The network interface module 1140 may be made visible to the other modules of the computer system 1000 through one or more logical interfaces. The actual stacks of protocols used by physical network interface(s) and/or logical network interface(s) 1142, 1144, 1146, 1148 of the network interface module 1140 do not affect the teachings of the present invention. The variants of the processor module 1130, memory module 1120 and network interface module 1140 that are usable in the context of the present invention will be readily apparent to persons skilled in the art.

A bus 1170 is depicted as an example of means for exchanging data between the different modules of the computer simulation system 1000. The present invention is not affected by the way the different modules exchange information between them. For instance, the memory module 1120 and the processor module 1130 could be connected by a parallel bus, but could also be connected by a serial connection or involve an intermediate module (not shown) without affecting the teachings of the present invention.

Likewise, even though explicit references to the memory module 1120 and/or the processor module 1130 are not made throughout the description of the various embodiments, persons skilled in the art will readily recognize that such modules are used in conjunction with other modules of the computer simulation system 1000 to perform routine as well as innovative steps related to the present invention.

The interactive computer simulation station 1100 also comprises a Graphical User Interface (GUI) module 1150 comprising one or more display screen(s). The display screens of the GUI module 1150 could be split into one or more flat panels, but could also be a single flat or curved screen visible from an expected user position (not shown) in the interactive computer simulation station 1100. For instance, the GUI module 1150 may comprise one or more mounted projectors for projecting images on a curved refracting screen. The curved refracting screen may be located far enough from the user of the interactive computer program to provide a collimated display. Alternatively, the curved refracting screen may provide a non-collimated display.

The computer simulation system 1000 comprises a storage system 1500A-C that may log dynamic data in relation to the dynamic sub-systems while the interactive computer simulation is performed. FIG. 2 shows examples of the storage system 1500A-C as a distinct database system 1500A, a distinct module 1500B of the interactive computer simulation station 1100 or a sub-module 1500C of the memory module 1120 of the interactive computer simulation station 1100. The storage system 1500A-C may also comprise storage modules (not shown) on the interactive computer simulation stations 1200, 1300. The storage system 1500A-C may be distributed over different systems A, B, C and/or the interactive computer simulations stations 1200, 1300 or may be in a single system. The storage system 1500A-C may comprise one or more logical or physical as well as local or remote hard disk drive (HDD) (or an array thereof). The storage system 1500A-C may further comprise a local or remote database made accessible to the interactive computer simulation station 1100 by a standardized or proprietary interface or via the network interface module 1140. The variants of the storage system 1500A-C usable in the context of the present invention will be readily apparent to persons skilled in the art.

An Instructor Operating Station (IOS) 1600 may be provided for allowing various management tasks to be performed in the interactive computer simulation system 1000. The tasks associated with the IOS 1600 allow for control and/or monitoring of one or more ongoing interactive computer simulations. For instance, the IOS 1600 may be used for allowing an instructor to participate in the interactive computer simulation and possibly additional interactive computer simulation(s). In some embodiments, a distinct instance of the IOS 1600 may be provided as part of each one of the interactive computer simulation stations 1100, 1200, 1300. In other embodiments, a distinct instance of the IOS 1600 may be co-located with each one of the interactive computer simulation stations 1100, 1200, 1300 (e.g., within the same room or simulation enclosure) or remote therefrom (e.g., in different rooms or in different locations). Skilled persons will understand that many instances of the IOS 1600 may be concurrently provided in the computer simulation system 1000. The IOS 1600 may provide a computer simulation management interface, which may be displayed on a dedicated IOS display module 1610 or the GUI module 1150. The IOS 1600 may be physically co-located with one or more of the interactive computer simulation stations 1100, 1200, 1300 or it may be situated at a location remote from the one or more interactive computer simulation stations 1100, 1200, 1300.

The IOS display module 1610 may comprise one or more display screens such as a wired or wireless flat screen, a wired or wireless touch-sensitive display, a tablet computer, a portable computer or a smart phone. When multiple interactive computer simulation stations 1100, 1200, 1300 are present in the interactive computer simulation system 1000, the instance of the IOS 1600 may present different views of the computer program management interface (e.g., to manage different aspects therewith) or they may all present the same view thereof. The computer program management interface may be permanently shown on a first of the screens of the IOS display module 1610 while a second of the screen of the IOS display module 1610 shows a view of the interactive computer simulation being presented by one of the interactive computer simulation stations 1100, 1200, 1300). The computer program management interface may also be triggered on the IOS 1600, e.g., by a touch gesture and/or an event in the interactive computer program (e.g., milestone reached, unexpected action from the user, or action outside of expected parameters, success or failure of a certain mission, etc.). The computer program management interface may provide access to settings of the interactive computer simulation and/or of the computer simulation stations 1100, 1200, 1300. A virtualized IOS (not shown) may also be provided to the user on the IOS display module 1610 (e.g., on a main screen, on a secondary screen or a dedicated screen thereof). In some embodiments, a Brief and Debrief System (BDS) may also be provided. In some embodiments, the BDS is a version of the 105 configured to selectively play back data recorded during a simulation session.

The tangible instruments of the instrument modules 1160, 1260 and/or 1360 are replicas (e.g. full-scale replicas) that closely resemble and thus replicate the real aircraft control element being simulated. In the example of the simulated aircraft system, for instance, in relation to an exemplary flight simulator embodiment, the instrument module 1160 may comprise a control yoke and/or side stick, rudder pedals, a throttle, a flap switch, a transponder switch, a landing gear lever, a parking brake switch, and aircraft instruments (air speed indicator, attitude indicator, altimeter, turn coordinator, vertical speed indicator, heading indicator, etc). In the case of a helicopter or other rotary wing aircraft, the tangible instruments may include the cyclic stick, collective stick and pedals. The tangible instruments of the helicopter may also include various switches, buttons or other physical controls for navigation lights, radio communications, etc. Depending on the type of simulation (e.g., level of immersivity), the tangible instruments may be more or less realistic compared to those that would be available in an actual aircraft. For instance, the tangible instruments provided by the instrument module(s) 1160, 1260 and/or 1360 may replicate those found in an actual aircraft cockpit or be sufficiently similar to those found in an actual aircraft cockpit for training purposes. As previously described, the user or trainee can control the virtual representation of the simulated interactive object in the interactive computer simulation by operating the tangible instruments provided by the instrument modules 1160, 1260 and/or 1360. In the context of an immersive simulation being performed in the computer simulation system 1000, the instrument module(s) 1160, 1260 and/or 1360 would typically replicate of an instrument panel found in the actual interactive object being simulated. In such an immersive simulation, the dedicated graphics processing unit 1132 would also typically be required. While the present invention is applicable to immersive simulations (e.g., flight simulators certified for commercial pilot training and/or military pilot training), skilled persons will readily recognize and be able to apply its teachings to other types of interactive computer simulations.

In some embodiments, an optional external input/output (I/O) module 1162 and/or an optional internal input/output (I/O) module 1164 may be provided with the instrument module 1160. Skilled people will understand that any of the instrument modules 1160, 1260 and/or 1360 may be provided with one or both of the I/O modules 1162, 1164 such as the ones depicted for the computer simulation station 1100. The external input/output (I/O) module 1162 of the instrument module(s) 1160, 1260 and/or 1360 may connect one or more external tangible instruments (not shown) therethrough. The external I/O module 1162 may be required, for instance, for interfacing the computer simulation station 1100 with one or more tangible instruments identical to an Original Equipment Manufacturer (OEM) part that cannot be integrated into the computer simulation station 1100 and/or the computer simulation station(s) 1200, 1300 (e.g., a tangible instrument exactly as the one that would be found in the interactive object being simulated). The internal input/output (I/O) module 1162 of the instrument module(s) 1160, 1260 and/or 1360 may connect one or more tangible instruments integrated with the instrument module(s) 1160, 1260 and/or 1360. The I/O module 1162 may comprise necessary interface(s) to exchange data, set data or get data from such integrated tangible instruments. The internal I/O module 1162 may be required, for instance, for interfacing the computer simulation station 1100 with one or more integrated tangible instruments that are identical to an Original Equipment Manufacturer (OEM) part that would be found in the interactive object being simulated. The I/O module 1162 may comprise necessary interface(s) to exchange data, set data or get data from such integrated tangible instruments.

The instrument module 1160 may comprise one or more tangible instrumentation components or subassemblies that may be assembled or joined together to provide a particular configuration of instrumentation within the computer simulation station 1100. As can be readily understood, the tangible instruments of the instrument module 1160 are configured to capture input commands in response to being physically operated by the user of the computer simulation station 1100.

The instrument module 1160 may also comprise a mechanical instrument actuator 1166 providing one or more mechanical assemblies for physical moving one or more of the tangible instruments of the instrument module 1160 (e.g., electric motors, mechanical dampeners, gears, levers, etc.). The mechanical instrument actuator 1166 may receive one or more sets of instruments (e.g., from the processor module 1130) for causing one or more of the instruments to move in accordance with a defined input function. The mechanical instrument actuator 1166 of the instrument module 1160 may alternatively, or additionally, be used for providing feedback to the user of the interactive computer simulation through tangible and/or simulated instrument(s) (e.g., touch screens, or replicated elements of an aircraft cockpit or of an operating room). Additional feedback devices may be provided with the computing device 1110 or in the computer system 1000 (e.g., vibration of an instrument, physical movement of a seat of the user and/or physical movement of the whole system, etc.).

The interactive computer simulation station 1100 may also comprise one or more seats (not shown) or other ergonomically designed tools (not shown) to assist the user of the interactive computer simulation in getting into proper position to gain access to some or all of the instrument module 1160.

In the depicted example of FIG. 2, the interactive computer simulation station 1100 shows optional interactive computer simulation stations 1200, 1300, which may communicate through the network 1400 with the simulation computing device. The stations 1200, 1300 may be associated to the same instance of the interactive computer simulation with a shared computer-generated environment where users of the computer simulation stations 1100, 1200, 1300 may interact with one another in a single simulation. The single simulation may also involve other simulation computer simulation stations (not shown) co-located with the computer simulation stations 1100, 1200, 1300 or remote therefrom. The computer simulation stations 1200, 1300 may also be associated with different instances of the interactive computer simulation, which may further involve other computer simulation stations (not shown) co-located with the computer simulation station 1100 or remote therefrom.

In the context of the depicted embodiments, runtime execution, real-time execution or real-time priority processing execution corresponds to operations executed during the interactive computer simulation that may have an impact on the perceived quality of the interactive computer simulation from a user perspective. An operation performed at runtime, in real time or using real-time priority processing thus typically needs to meet certain performance constraints that may be expressed, for instance, in terms of maximum time, maximum number of frames, and/or maximum number of processing cycles. For instance, in an interactive simulation having a frame rate of 60 frames per second, it is expected that a modification performed within 5 to 10 frames will appear seamless to the user. Skilled persons will readily recognize that real-time processing may not actually be achievable in absolutely all circumstances in which rendering images is required. The real-time priority processing required for the purpose of the disclosed embodiments relates to the perceived quality of service by the user of the interactive computer simulation and does not require absolute real-time processing of all dynamic events, even if the user was to perceive a certain level of deterioration in the quality of the service that would still be considered plausible.

A simulation network (e.g., overlaid on the network 1400) may be used, at runtime (e.g., using real-time priority processing or processing priority that the user perceives as real-time), to exchange information (e.g., event-related simulation information). For instance, movements of a vehicle associated with the computer simulation station 1100 and events related to interactions of a user of the computer simulation station 1100 with the interactive computer-generated environment may be shared through the simulation network. Likewise, simulation-wide events (e.g., related to persistent modifications to the interactive computer-generated environment, lighting conditions, modified simulated weather, etc.) may be shared through the simulation network from a centralized computer system (not shown). In addition, the storage module 1500A-C (e.g., a networked database system) accessible to all components of the computer simulation system 1000 involved in the interactive computer simulation may be used to store data necessary for rendering the interactive computer-generated environment. In some embodiments, the storage module 1500A-C is only updated from the centralized computer system and the computer simulation stations 1200, 1300 only load data therefrom.

The computer simulation system 1000 of FIG. 2 may be used to simulate the operation by a user of a user vehicle. For example, in a flight simulator, the interactive computer simulation system 1000 may be used to simulate the flying of an aircraft by a user acting as the pilot of the simulated aircraft. In a battlefield simulator, the simulator may simulate a user controlling one or more user vehicles such as airplanes, helicopters, warships, tanks, armored personnel carriers, etc. In both examples, the simulator may simulate an external vehicle (referred to herein as a simulated external vehicle) that is distinct from the user vehicle and not controlled by the user.

Figure 3:
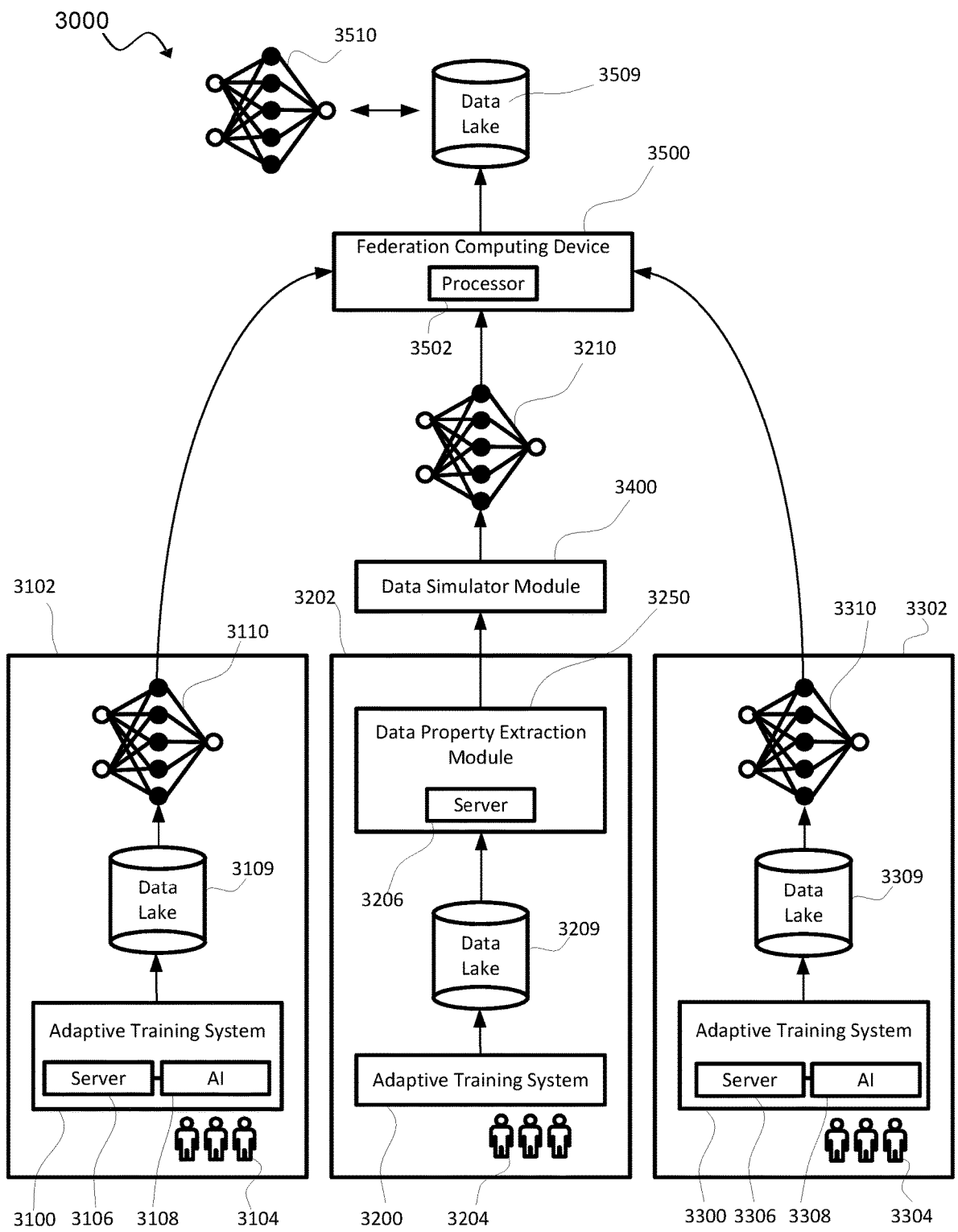
FIG. 3 depicts a federated machine learning system in accordance with an embodiment of the present invention.

FIG. 3 depicts by way of example a federated machine learning system 3000 that includes a first adaptive training system 3100 at a first training center 3102 to provide individualized training to a first group of students 3104. The first adaptive training system 3100 includes a first computing device 3106 executing a first artificial intelligence module 3108 for adapting the individualized training to each of the first group of students at the first training center and for developing a first learning model 3110 based on a first set of learning performance metrics for the first group of students. The learning performance metrics may be stored in a data lake 3109. As depicted by way of example in FIG. 3, the federated machine learning system 3000 also includes a second adaptive training system 3200 at a second training center 3202 to provide individualized training to a second group of students 3204. The second adaptive training system 3200 includes a second computing device 3206 executing a data property extraction module 3250 for extracting statistical properties from a second set of learning performance metrics (i.e. training data) for the second group of students at the second training center. The federated machine learning system 3000 also includes a data simulator module 3400 in data communication with the data property extraction module 3250 for generating simulated performance metrics (i.e. simulated training data) using extracted statistical properties from the second set of learning performance metrics for the second group of students to thereby generate a second learning model 3210. This statistical extraction and model reconstruction anonymize the original performance data. This is useful to protect the original performance data for example in the context of operating a secure training center. The federated machine learning system 3000 further includes a federation computing device 3500 in data communication with both the first computing device and the data simulator module to receive first model weights for the first learning model from the first computing device and to receive second model weights from the data simulator module, wherein the federation computing device comprises a processor 3502 and data lake 3509 to generate or refine a federated model 3510 based on the first and second model weights and to communicate federated model weights to the first computing device and to the data simulator module. The second training enter 3202 may be a secure training center such as a military training center where there is no artificial intelligence deployed for security reasons. This federated machine learning system 3000 enables cold-start deployment of a new adaptive training system in the federation adaptive training systems by leveraging the models of other adaptive training systems in the federation of adaptive training systems.

In one embodiment, as depicted in FIG. 3, the federated machine learning system 3000 includes a third adaptive training system 3300 at a third training center 3302 to provide individualized training to a third group of students 3304. The third adaptive training system includes a third computing device 3306 executing a third artificial intelligence module 3308 for adapting the individualized training to each of the third group of students at the third training center and for developing a third learning model 3310 based on a third set of learning performance metrics for the third group of students. The federation computing device 3500 may be in data communication with the third adaptive training system 3300 to receive model weights from the third learning model 3310 in the manner described above for the first adaptive training system 3100. Although three adaptive training systems are shown in FIG. 3, it will be appreciated that further adaptive training systems may be added to the federation. The federated machine learning system 3000 receives model weights from the various adaptive learning systems, processes these model weights to generate federated model weights and then communicates these federated model weights to the adaptive learning systems. As such, the adaptive training systems benefit from the learning of the other adaptive training systems of the federation without having to directly share data with each other.

In one embodiment, the federation computing device 3500 is configured to determine a first maturity coefficient indicative of a maturity of the first learning model and to also determine a second maturity coefficient indicative of the maturity of the second learning model. The first and second maturity coefficients may also be referred to as maturity weights or factors. The federation computing device is further configured to generate the federated model weights based on the first and second maturity coefficients. The more mature the model the greater the weight that is applied to the model weights obtained from that model. In other words, the model weights from various learning models are themselves weighted based on how mature each model is. The federated model weights are then shared with the first, second and third adaptive training systems or any subset thereof to enable these adaptive training system to use the federated model weights to further respective their own respective models.

In one embodiment, the first and second maturity coefficients are F1 scores. Alternatively, these may be accuracy classification scores. The first and second maturity coefficients may alternatively be obtained using a logarithmic loss function, an area under the curve, a mean absolute error or a mean squared error.

In some embodiments, the federated machine learning system 3000 may employ a federated learning algorithm (e.g. executed by the federated computing device 3500) to aggregate the updates (e.g. updated model weights) received by the server (e.g. processor 3502) from the individual dataset nodes (e.g. from the learning model of each adaptive training system). The individual dataset nodes send these updates after completing the local training for a specified or predetermined number of epochs. The algorithm starts by initializing the weights of a neural network model as $w_0$. The weights can be initialized randomly or by using the default Glorot kernel initializer. The Glorot initializer may be selected as the weight initializer because this initializer draws samples from a uniform distribution within a specified range, which depends on the size of the input tensors.

At communication round r, the server sends the initialized weights ($w_r$) to each of the individual dataset nodes. Each node splits its dataset into minibatches of size B and trains the neural network using $w_0$ and their respective dataset to update the weights from $w_r$ to $w_{r+1}$ utilizing Stochastic Gradient Descent (SGD). The number of epochs to perform the local training is fixed to E. Each individual node sends the updated weights $w^k_{r+1}$, where k is the kth node, to the central server. The server then averages the weights across the nodes to compute the new model weights $w_{r+1}$. The following pseudocode explains the algorithm followed for implementing federated learning.

The three data nodes are indexed by k; B is the local minibatch size, E is the number of local epochs, and η is the learning rate of the local optimizer.

```
ServerUpdate:
        Initialize w₀ (glorot_normal)
        for each communication round r = 1, 2, ... do
            for each client k, in parallel do
                w^k_{r+1} ß NodeUpdate(k, w_r)
            endfor
```
$$w_{r+1} \text{ ß } \sum_{k=0}^{n} \left(\frac{n_k}{n}\right) w^k_{r+1}$$
```
        endfor
NodeUpdate (k,w): //on node k
        ß ← (split the data of the node into batches of size B)
        for each local epoch i from 1 to E do
            for batch b ∈ ß do
                w ß w - nΔℓ(w;b)
            endfor
        endfor
        Send w to server.
```

Among the different types of federated learning that is based on data distribution, the horizontal federated learning approach is selected because the dataset features are similar, but the sample IDs are different and non-overlapping. Since the datasets include data about three different pilot training programs in this example of FIG. 3, the number of total courses and lessons across all three datasets are different therefore, resulting in a different feature space. In order to facilitate the use of a single neural network model for all three local nodes (the models of the three adaptive learning systems) of the federated machine learning system, the dimensions of all three datasets are reduced to a single feature length. This may be achieved by using auto-encoders. By fixing the size of the bottleneck layer of the auto-encoder to 100, the dimension of all three datasets may be reduced to 100. This eases the implementation of the federated machine learning system. The dimensionality reduction can be achieved using other techniques in other embodiments.

With reference to the example of FIG. 3, there are three datasets in this federated organization, i.e. federated machine learning system. For example, one of the datasets may come from a first flight training center in a first geographical location, the second dataset from a second flight training center in a second geographical location and a third dataset from a third flight training center in a third geographical location. IN this particular example presented in FIG. 3, the second dataset is obtained from simulated data by extracting statistical properties from the dataset of the second flight training venter which is, in this example, a secure training center where the raw data source is not directly shared and where AI deployment is not allowed. The datasets may include student performance data which may include grades for students in different lessons or units of their respective program. Data from multiple learning environments are collected for various training aspects such as academic learning and examination, simulator performance, actual flight performance and instructor comments. These may be scored using a competency hierarchy framework that defines success criteria for each learning objective.

Some training centers, such as the secure training center (i.e. the second training center), are prohibited from deploying artificial intelligence algorithms locally. In order to address this problem, two modules are provided as described above, namely the data property extraction module and the data simulator module.

The data property extraction module uses multinomial sampling from distributions to draw student grades for each block difficulty. Student grades may be collected for a plurality of blocks of lessons for a plurality of different levels of difficulty. Each lesson may be graded according to multiple skill levels. For example, there may be 3 blocks with 3 different levels of difficulty and 4 different skill levels. These affect the parameters of the multinomial distribution from which the grades are drawn. Certain courses correlate, which means the grades between lessons are related. This is achieved using a graph method where the correlation is modelled via edges between lessons (where each lesson is a node). The edges are placed based on hard pre-requisites (from curriculum) and soft pre-requisites (heuristics). The normalized graph adjacency matrix is used to multiply the grade vector to provide a weighted average output of the related observations. This effectively conditions future observations based on past grades.

Conditioning of the lessons may be accomplished using the Watts-Strogatz random graph algorithm. Each graph node is a lesson, while each edge between nodes denotes a correlation between lessons. The generally follows two general steps: (1) create a lattice ring with N (number of lessons) nodes of mean degree 2K (correlation between lessons) and wherein each node is connected to its K nearest neighbors on each side; and (2) for each edge in the graph, rewire the target node with some probability β such that the rewired edge cannot self-loop or cannot be duplicated.

To solve the cold start issue, a hybrid system may be employed by incorporating lesson prerequisite rules. The instructor will be able to consume the results from the adaptive learning AI (ALAI) module as long as there is at least a data point stored into the LRS (learning record store). However, the more students and learning sessions have been put in place, the higher the accuracy and relevance of the AI outcomes. The cold start problem may be solved by leveraging business rules to initialize the AI engines (using the prerequisite rules) and to generate initial model parameters of the AI engines using dummy data.

Figure 4:
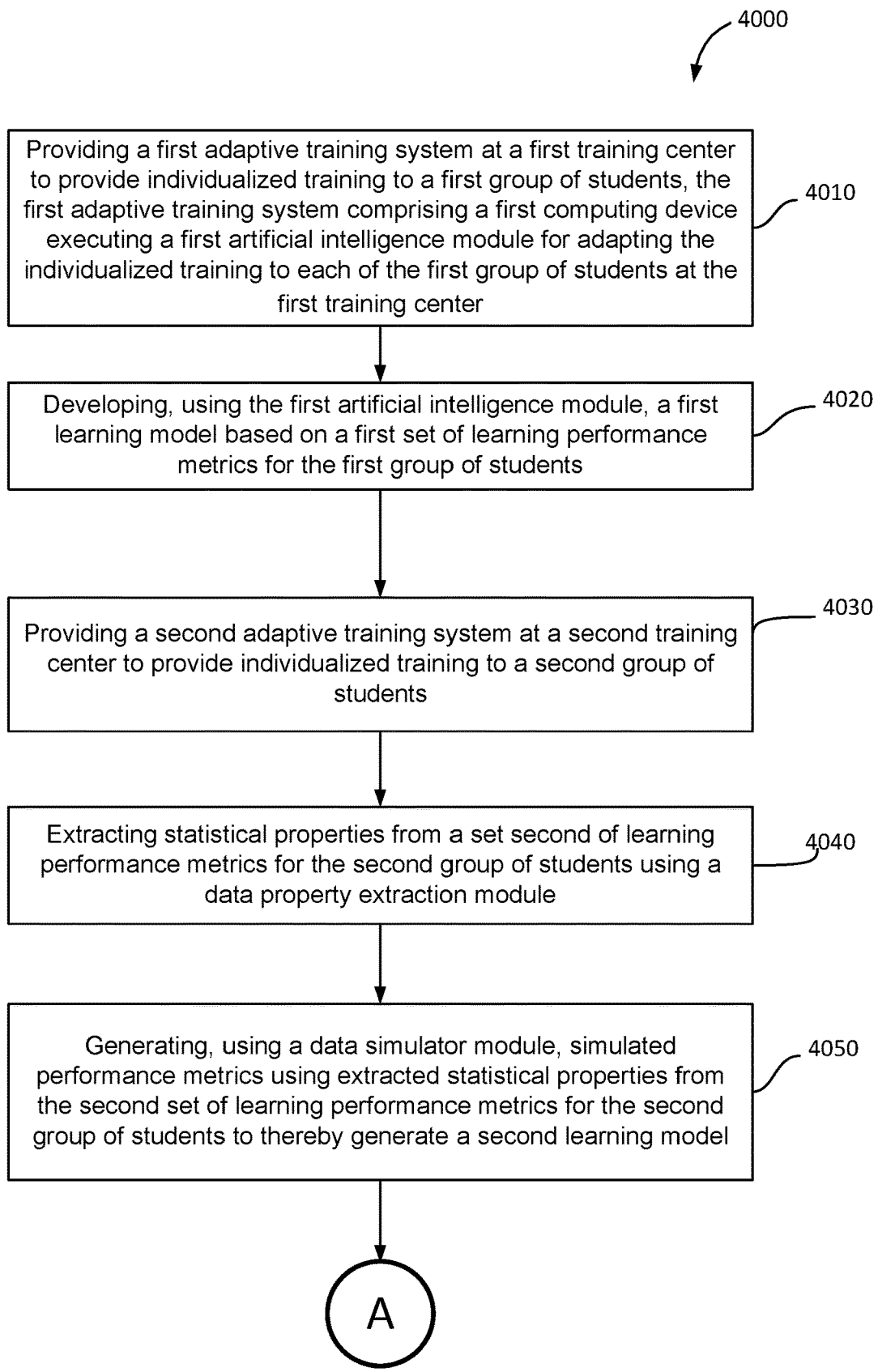
FIG. 4 is a flowchart of a method of implementing the federated machine learning system of FIG. 3.
Figure 5:
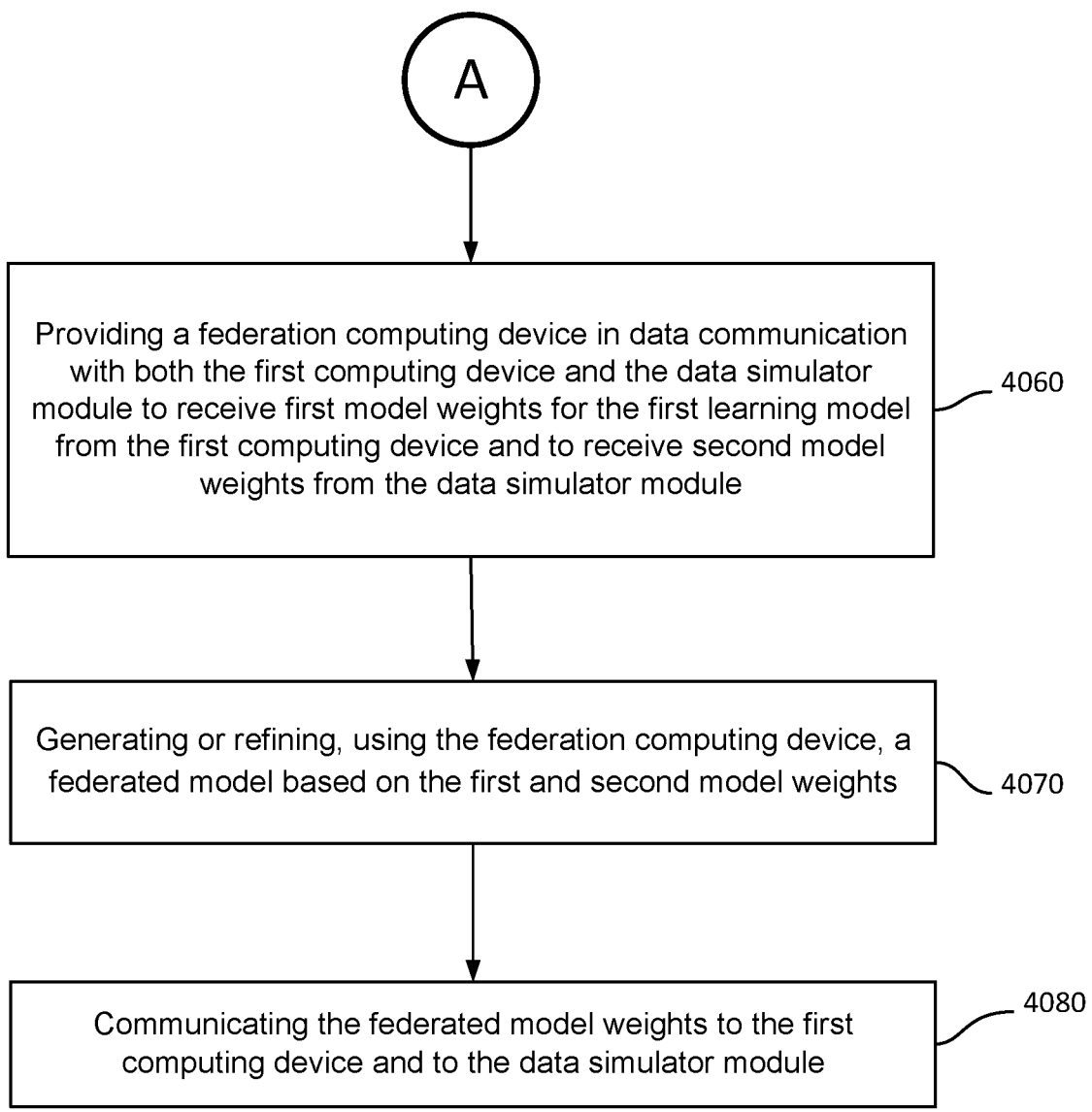
FIG. 5 depicts further steps of the method shown in FIG. 4.

Another inventive aspect of the disclosure is a computer-implemented method of implementing a federated machine learning system for adaptive training systems. As depicted in FIG. 4, the method 4000 entails providing 4010 a first adaptive training system at a first training center to provide individualized training to a first group of students, the first adaptive training system comprising a first computing device executing a first artificial intelligence module for adapting the individualized training to each of the first group of students at the first training center. The method entails developing 4020, using the first artificial intelligence module, a first learning model based on a first set of learning performance metrics for the first group of students. The method further entails providing 4030 a second adaptive training system at a second training center to provide individualized training to a second group of students and extracting 4040 statistical properties from a second set of learning performance metrics (training data) for the second group of students using a data property extraction module. The method involves generating 4050, using a data simulator module, simulated performance metrics (training data) using extracted statistical properties from the second set of learning performance metrics (training data) for the second group of students to thereby generate a second learning model. As further depicted in FIG. 5, the method also involves providing 4060 a federation computing device in data communication with both the first computing device and the data simulator module to receive first model weights for the first learning model from the first computing device and to receive second model weights from the data simulator module. The method further entails generating 4070 or refining, using the federation computing device, a federated model based on the first and second model weights and communicating 4080 the federated model weights to the first computing device and to the data simulator module.

Figure 6:
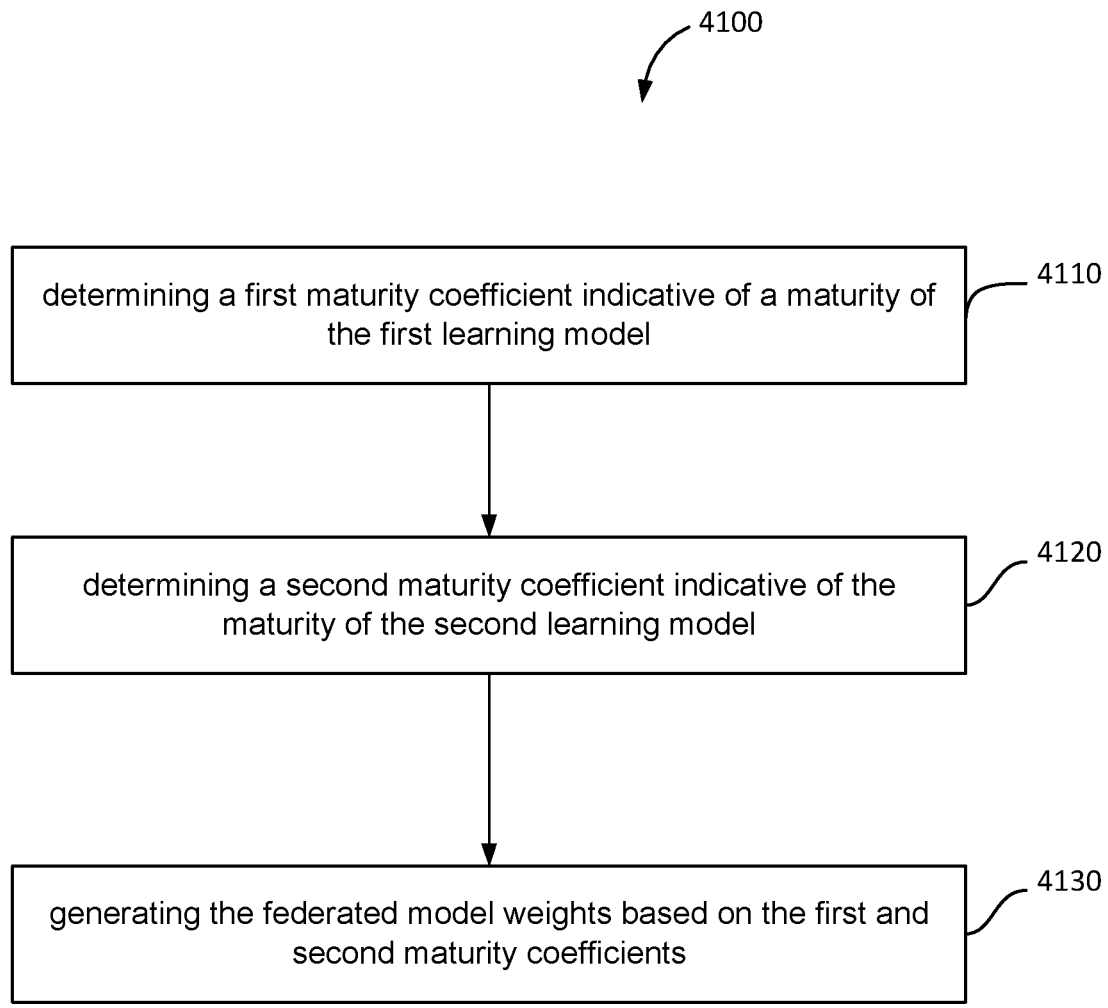
FIG. 6 depicts steps of a further method in accordance with one embodiment.

FIG. 6 depicts a further method that is related to the method described above. In this further method, the maturity of the models is used to create the federated model weights. As depicted in FIG. 6, this further method 4100 entails determining 4110 a first maturity coefficient indicative of a maturity of the first learning model and determining 4120 a second maturity coefficient indicative of the maturity of the second learning model. The method involves generating 4130 the federated model weights based on the first and second maturity coefficients.

In one embodiment, the computerized system 100 interacts physically with the student (user) by receiving user input via the tangible instruments of the instrument module 1260 of the flight simulator 1100. In other words, the user/student provides physical user input via one or more of the tangible instruments of the flight simulator 1100 during flight training. This user input from the student is captured by the flight simulator and used to evaluate student performance in effecting a given maneuver, e.g. takeoff, final approach, landing, performing a coordinated turn, performing an emergency maneuver, etc. For example, the user/student can provide user input to the flight simulator by moving the control yoke or other tangible instrument of the flight simulator to effect a flight maneuver. The performance assessment module 124 assesses the performance of the student based on the user input at the tangible instrument to create student performance data. As described above, the student performance data in one embodiment is communicated to a learning experience platform (LXP) 130 configured to receive and process the student performance data. In one embodiment, the LXP 130 is a computer or server or cloud-based computing service or any other computing device having a processor and memory for receiving, storing and processing the student performance data. The student performance data can also be stored in the data lake 150 as described above where it is accessed by the adaptive learning artificial intelligence (ALAI) module 160. The ALAI 160 uses the student performance data to adapt the training of the student. In this embodiment, the student performance data (first and second sets of learning performance metrics) is derived from the user input provided by the user (student) via the tangible instrument in the flight simulator 1100. The student performance data may also include other simulation performance results for the student operating the simulated vehicle in the simulation system (e.g. in the flight simulator 1100). Optionally, the student performance data may be augmented by also including instructor-graded performance results of the student based on the student operating the actual machine, e.g. actually flying a real aircraft with a trainer aboard and grading the student. Optionally, the student performance data is augmented by electronic learning content results from an electronic learning module that delivers electronic learning content to a student computing device used by the student.

Tangible user input provided by a group of students thus provides the aggregate student performance data for the federated machine learning system described above. In other words, the aggregate student performance data from the first group of students is used by the first adaptive training system at the first training center to develop a first learning model based on a first set of learning performance metrics for the first group of students. A second adaptive training system at a second training center collects student performance metrics (i.e. learning performance metrics or training data) from user input provided by a second group of students via tangible instruments. The second adaptive training system furthermore executes a data property extraction module for extracting statistical properties from the second set of learning performance metrics (training data) for the second group of students at the second training center. As described above, a data simulator module in data communication with the data property extraction module generates simulated performance metrics (simulated training data) using extracted statistical properties from the second set of learning performance metrics (training data) for the second group of students to thereby generate a second learning model. This enables a federation computing device in data communication with both the first computing device and the data simulator module to receive first model weights for the first learning model from the first computing device and to receive second model weights from the data simulator module. The federation computing device then generates or refines a federated model based on the first and second model weights and communicates federated model weights to the first computing device and to the data simulator module. Accordingly, the federated machine learning system is able to generate and/or refine its learning model(s) based on physical user input provided via the tangible instruments of the simulation systems.

These methods can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc. For the purposes of this specification, the expression "module" is used expansively to mean any software, hardware, firmware, or combination thereof that performs a particular task, operation, function or a plurality of related tasks, operations or functions. When used in the context of software, the module may be a complete (standalone) piece of software, a software component, or a part of software having one or more routines or a subset of code that performs a discrete task, operation or function or a plurality or related tasks, operations or functions. Software modules have program code (machine-readable code) that may be stored in one or more memories on one or more discrete computing devices. The software modules may be executed by the same processor or by discrete processors of the same or different computing devices.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A federated machine learning system for training students, the federated machine learning system comprising:
a first adaptive training system at a first training center to provide individualized training to a first group of students, the first adaptive training system comprising a first computing device executing a first artificial intelligence module for adapting the individualized training to each of the first group of students at the first training center and for developing a first learning model based on a first set of learning performance metrics for the first group of students;
a second adaptive training system at a second training center to provide individualized training to a second group of students, the second adaptive training system comprising a second computing device executing a data property extraction module for extracting statistical properties from a second set of learning performance metrics for the second group of students at the second training center;
a data simulator module in data communication with the data property extraction module for generating simulated performance metrics using extracted statistical properties from the second set of learning performance metrics for the second group of students to thereby generate a second learning model; and
a federation computing device in data communication with both the first computing device and the data simulator module to receive first model weights for the first learning model from the first computing device and to receive second model weights from the data simulator module, wherein the federation computing device comprises a processor to generate or refine a federated model based on the first and second model weights and to communicate federated model weights to the first computing device and to the data simulator module.

2. The system of claim 1 comprising a third adaptive training system at a third training center to provide individualized training to a third group of students, the third adaptive training system comprising a third computing device executing a third artificial intelligence module for adapting the individualized training to each of the third group of students at the third training center and for developing a third learning model based on a third set of learning performance metrics for the third group of students.

3. The system of claim 1 wherein the federation computing device is configured to:
determine a first maturity coefficient indicative of a maturity of the first learning model;
determine a second maturity coefficient indicative of the maturity of the second learning model; and
generate the federated model weights based on the first and second maturity coefficients.

4. The system of claim 3 wherein the first and second maturity coefficients are F1 scores or accuracy classification scores.

5. The system of claim 3 wherein the first and second maturity coefficients are obtained using a logarithmic loss function, an area under a curve, a mean absolute error or a mean squared error.

6. The system of claim 1 wherein the first and second sets of learning performance metrics comprise simulation performance results that are obtained from user input received via a tangible instrument of a simulation system.

7. The system of claim 6 wherein the tangible instrument comprises a replica of a machine instrument that replicates an actual control element of the machine being simulated.

8. The system of claim 7 wherein the machine is an aircraft, the simulation system is a flight simulator, and the tangible instrument comprises one of a control yoke, side stick, rudder pedal, throttle, flap switch, cyclic stick and collective stick.

9. A computer-implemented method of implementing a federated machine learning system for training students, method comprising:
providing a first adaptive training system at a first training center to provide individualized training to a first group of students, the first adaptive training system comprising a first computing device executing a first artificial intelligence module for adapting the individualized training to each of the first group of students at the first training center;
developing, using the first artificial intelligence module, a first learning model based on a first set of learning performance metrics for the first group of students;
providing a second adaptive training system at a second training center to provide individualized training to a second group of students;
extracting statistical properties from a second set of learning performance metrics for the second group of students using a data property extraction module;
generating, using a data simulator module, simulated performance metrics using extracted statistical properties from the second set of learning performance metrics for the second group of students to thereby generate a second learning model; and
providing a federation computing device in data communication with both the first computing device and the data simulator module to receive first model weights for the first learning model from the first computing device and to receive second model weights from the data simulator module;
generating or refining, using the federation computing device, a federated model based on the first and second model weights;

communicating the federated model weights to the first computing device and to the data simulator module.

10. The method of claim 9 comprising:
providing a third adaptive training system at a third training center to provide individualized training to a third group of students, the third adaptive training system comprising a third computing device executing a third artificial intelligence module for adapting the individualized training to each of the third group of students at the third training center;
developing a third learning model based on a third set of learning performance metrics for the third group of students.

11. The method of claim 9 wherein generating or refining the federated model comprises:
determining a first maturity coefficient indicative of a maturity of the first learning model;
determining a second maturity coefficient indicative of the maturity of the second learning model; and
generating the federated model weights based on the first and second maturity coefficients.

12. The method of claim 11 wherein determining the first and second maturity coefficients comprises using F1 scores or accuracy classification scores.

13. The method of claim 11 wherein determining the first and second maturity coefficients comprises using a logarithmic loss function, an area under a curve, a mean absolute error or a mean squared error.

14. The method of claim 9 further comprising obtaining simulation performance results to define the first and second sets of learning performance metrics by processing user input received via a tangible instrument of a simulation system.

15. The method of claim 14 wherein the tangible instrument comprises a replica of a machine instrument that replicates an actual control element of the machine being simulated.

16. The method of claim 15 wherein the machine is an aircraft, the simulation system is a flight simulator, and the tangible instrument comprises one of a control yoke, side stick, rudder pedal, throttle, flap switch, cyclic stick and collective stick.

17. A non-transitory computer-readable medium having instructions in code which are stored on the computer-readable medium and which, when executed by one or more processors of one or more computers, cause the one or more computers to implement a federated machine learning system for training students by:
providing a first adaptive training system at a first training center to provide individualized training to a first group of students, the first adaptive training system comprising a first computing device executing a first artificial intelligence module for adapting the individualized training to each of the first group of students at the first training center;
developing, using the first artificial intelligence module, a first learning model based on a first set of learning performance metrics for the first group of students;
providing a second adaptive training system at a second training center to provide individualized training to a second group of students;
extracting statistical properties from a second set of learning performance metrics for the second group of students using a data property extraction module;
generating, using a data simulator module, simulated training data using extracted statistical properties from the second set of learning performance metrics for the second group of students to thereby generate a second learning model; and
providing a federation computing device in data communication with both the first computing device and the data simulator module to receive first model weights for the first learning model from the first computing device and to receive second model weights from the data simulator module;
generating or refining, using the federation computing device, a federated model based on the first and second model weights;
communicating the federated model weights to the first computing device and to the data simulator module.

18. The computer-readable medium of claim 17 comprising code to cause the federated machine learning system to:
provide a third adaptive training system at a third training center to provide individualized training to a third group of students, the third adaptive training system comprising a third computing device executing a third artificial intelligence module for adapting the individualized training to each of the third group of students at the third training center;
develop a third learning model based on a third set of learning performance metrics for the third group of students.

19. The computer-readable medium of claim 17 comprising code to cause the federated machine learning system to:
determine a first maturity coefficient indicative of a maturity of the first learning model;
determine a second maturity coefficient indicative of the maturity of the second learning model; and
generate the federated model weights based on the first and second maturity coefficients.

20. The computer-readable medium of claim 19 comprising code to cause the federated machine learning system to determine the first and second maturity coefficients using F1 scores or accuracy classification scores.

21. The computer-readable medium of claim 19 comprising code to cause the federated machine learning system to determine the first and second maturity coefficients using a logarithmic loss function, an area under a curve, a mean absolute error or a mean squared error.

22. The non-transitory computer-readable medium of claim 17 further comprising code for processing user input received via a tangible instrument of a simulation system to obtain simulation performance results that define the first and second sets of learning performance metrics comprise.

23. The non-transitory computer-readable medium of claim 22 wherein the tangible instrument comprises a replica of a machine instrument that replicates an actual control element of the machine being simulated.

24. The non-transitory computer-readable medium of claim 23 wherein the machine is an aircraft, the simulation system is a flight simulator, and the tangible instrument comprises one of a control yoke, side stick, rudder pedal, throttle, flap switch, cyclic stick and collective stick.

\* \* \* \* \*